(12) United States Patent
Gould et al.

(10) Patent No.: US 11,055,070 B2
(45) Date of Patent: *Jul. 6, 2021

(54) CLIENT AND GATEWAY SYNCHRONIZATION IN INDUSTRIAL CONTROL SYSTEMS

(71) Applicant: Inductive Automation, LLC, Folsom, CA (US)

(72) Inventors: Carl Reuben Gould, Folsom, CA (US); Perry Linn Arellano-Jones, Sacramento, CA (US)

(73) Assignee: Inductive Automation, LLC, Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,502

(22) Filed: Nov. 2, 2020

(65) Prior Publication Data

US 2021/0048989 A1 Feb. 18, 2021

Related U.S. Application Data

(63) Continuation of application No. 16/425,816, filed on May 29, 2019, now Pat. No. 10,846,063.

(Continued)

(51) Int. Cl.
*G06F 8/34* (2018.01)
*G06F 8/77* (2018.01)
(Continued)

(52) U.S. Cl.
CPC ............ *G06F 8/34* (2013.01); *G05B 19/4186* (2013.01); *G05B 19/41855* (2013.01);
(Continued)

(58) Field of Classification Search
CPC ..... G06F 8/34; G06F 8/77; G06F 8/38; H04L 65/102; H04L 67/1095; H04L 67/42;
(Continued)

(56) References Cited

U.S. PATENT DOCUMENTS 8,407,584 B1 3/2013 Boodman et al.
8,863,083 B2 10/2014 McKellar et al.
(Continued)

FOREIGN PATENT DOCUMENTS

WO WO 2018/219178 A1 12/2018
WO WO-2018219178 A1 * 12/2018 ............. H04L 67/32

OTHER PUBLICATIONS

IEEE: Web Performance Evaluation for Internet of Things Applications. Zoran B. Babovic1, (Student Member, IEEE), Jelica Protic2, and Veljko Miluntinovic2, (Fellow, IEEE). Nov. 2016 (Year: 2016).*

(Continued)

*Primary Examiner* — Hassan A Phillips
*Assistant Examiner* — Mohammed S Chowdhury
(74) *Attorney, Agent, or Firm* — Fenwick & West LLP

(57) ABSTRACT

A method provides a synchronization cycle for updating changing component property values at a client and a gateway system. When the client receives a change to a value, it saves the change as a pending value in association with an existing value for the component property. The client sends a set of changes and an identifier to the gateway system. The gateway system updates its component property values accordingly. The gateway system accumulates changes to property values including changes from the client and other changes received via data bindings or other methods. The gateway system sends a message to the client including the accumulated property value changes and the identifiers associated with client-provided value changes that have been applied. The client updates its component property values according to the accumulated changes and removes references to pending values that are associated with identifiers sent back by the gateway system.

14 Claims, 7 Drawing Sheets

Related U.S. Application Data

(60) Provisional application No. 62/732,998, filed on Sep. 18, 2018.

(51) Int. Cl.
*G06Q 10/10* (2012.01)
*G05B 19/418* (2006.01)
*H04L 29/06* (2006.01)
*H04L 29/08* (2006.01)

(52) U.S. Cl.
CPC .............. *G06F 8/77* (2013.01); *G06Q 10/103* (2013.01); *H04L 65/102* (2013.01); *H04L 67/1095* (2013.01); *G05B 2219/31093* (2013.01); *G05B 2219/31213* (2013.01); *G05B 2219/31348* (2013.01); *H04L 67/42* (2013.01)

(58) Field of Classification Search
CPC .......... G05B 19/4186; G05B 19/41855; G05B 2219/31213; G05B 2219/31348; G05B 2219/31093; G06Q 10/103
See application file for complete search history.

(56) References Cited

U.S. PATENT DOCUMENTS

| | | |
|---|---|---|
| 10,552,125 B1 | 2/2020 | Gould et al. |
| 10,698,647 B2 | 6/2020 | Shipper et al. |
| 2004/0001089 A1 | 1/2004 | Becker et al. |
| 2004/0133848 A1 | 7/2004 | Hunt et al. |
| 2009/0327354 A1 | 12/2009 | Resnick et al. |
| 2013/0006395 A1 | 1/2013 | Plache et al. |
| 2014/0222899 A1* | 8/2014 | Supramaniam ......... H04L 63/08 709/203 |
| 2014/0280605 A1* | 9/2014 | Zhang ................. H04L 67/1095 709/205 |
| 2015/0020080 A1 | 1/2015 | Simsek et al. |
| 2015/0200906 A1* | 7/2015 | Gan Esh ................. H04L 51/34 709/206 |
| 2015/0222604 A1* | 8/2015 | Ylonen .................. G06F 21/575 713/171 |
| 2016/0134932 A1* | 5/2016 | Karp ....................... H04L 67/22 348/155 |
| 2016/0154774 A1 | 6/2016 | Kolam et al. |
| 2016/0261425 A1* | 9/2016 | Horton ............... G05D 23/1917 |
| 2016/0291959 A1 | 10/2016 | Searle et al. |
| 2016/0294605 A1 | 10/2016 | Searle et al. |
| 2017/0176034 A1 | 6/2017 | Hussain et al. |
| 2019/0132276 A1 | 5/2019 | Scheiber et al. |

OTHER PUBLICATIONS

United States Office Action, U.S. Appl. No. 16/353,814, dated May 21, 2019, 16 pages.
United States Office Action, U.S. Appl. No. 16/773,841, dated Mar. 9, 2020, 23 pages.
United States Office Action, U.S. Appl. No. 16/425,816, dated Aug. 28, 2019, 25 pages.
United States Office Action, U.S. Appl. No. 16/425,816, dated Jan. 23, 2020, 28 pages.

* cited by examiner

CLIENT AND GATEWAY SYNCHRONIZATION IN INDUSTRIAL CONTROL SYSTEMS

CROSS REFERENCE TO RELATED APPLICATIONS

This application is a continuation of U.S. application Ser. No. 16/425,816, filed May 29, 2019, which claims a benefit of U.S. Provisional Application No. 62/732,998, filed Sep. 18, 2018, the contents of which are incorporated herein by reference in their entirety.

BACKGROUND OF THE INVENTION

Field of Art

This disclosure relates generally to data synchronization, and in particular to real-time synchronization of data display and controls.

Description of Related Art

Industrial processes can produce a great deal of useful and important data related to the states and conditions of associated machines and other data production sources. For example, it is advantageous for a manager of a factory to be able to monitor the state of a pump, oven, or pipeline remotely without the need to inspect the entity in person. Real-time remote monitoring of industrial processes becomes especially important at scale. For example, inspecting hundreds of motors in person at multiple factories may be infeasible for a factory manager. Furthermore, a need to access a central database prevents remote systems from being able to provide real-time feedback to users since there is a network delay inherent in updating a backend system prior to using a changed value.

SUMMARY

A gateway system hosts an authoritative version of component property values associated with an application and a client synchronizes a local copy of the component property values. The client may be a system that is used to contact and obtain data from a server system, e.g., the gateway system. When a change is made to a component property value at the client, the client saves the change as a pending value in association with a current value. A request to the client for the component property value will return the pending value, making the change appear, to a user of the client, to take place in real time, and to effectively allow the change to take place at the client before a synchronization is completed with the gateway system.

The client sends a message to the gateway system to update the gateway system about client-side changes. The message includes a synchronization identifier that allows the client to keep track of which changes have been sent to the gateway system. The gateway system updates the authoritative copy of the component property values based on the information received in the message from the client. The gateway system sends an update message to the client including values that have changed at the gateway system. The changed values at the gateway system can include updates made in response to the message from the client as well as updates from other data production sources that communicate with the gateway system and cause component property values to change. Once the gateway system has updated the values based on the changes received in the message from the client, the gateway system includes the synchronization identifier associated with the changes in an update message that is sent back to the client.

In response to receiving the update message from the gateway system, the client saves changes indicated in the update message. If the update message received from the gateway system includes a synchronization identifier, the client removes references to pending component property values that are associated with the synchronization identifier.

The synchronization process operates on a whole application, not merely on individual property values. Thus, changes to any part of an application from the client side or from the gateway system side can be kept up to date even with many value or configuration changes occurring at different parts of an application simultaneously.

The features and advantages described in this summary and the following detailed description are not all-inclusive. Many additional features and advantages will be apparent to one of ordinary skill in the art in view of the drawings, specification, and claims hereof.

Figure 1:
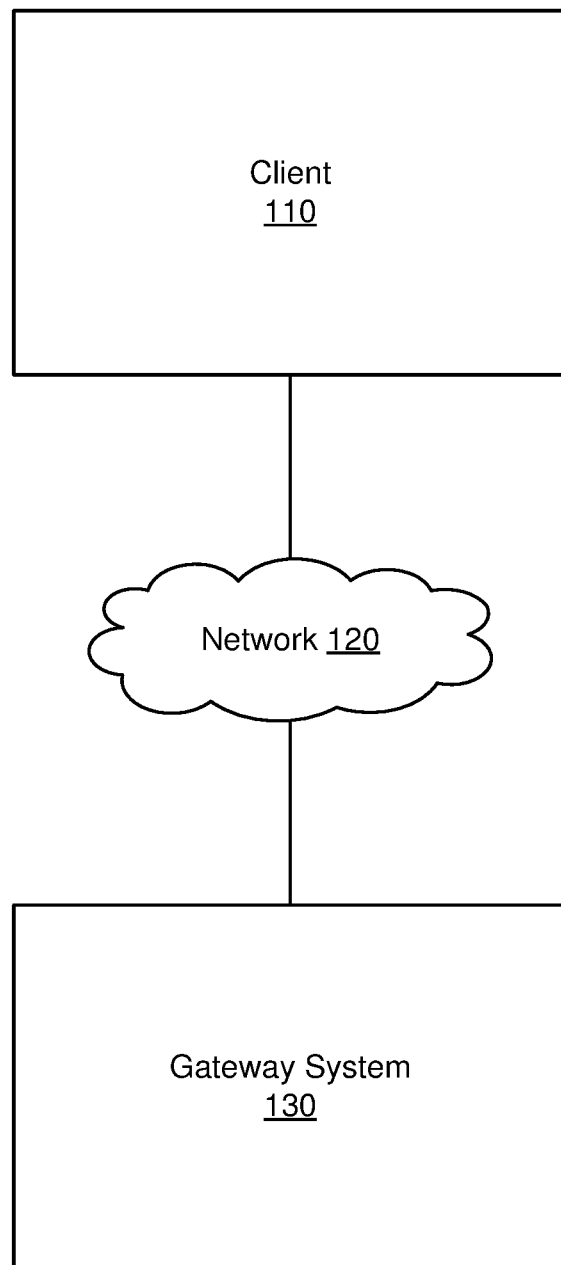
FIG. 1 is a high-level block diagram of a system environment for a gateway system 130, in accordance with an embodiment.

The figures depict an embodiment of the invention for purposes of illustration only. One skilled in the art will readily recognize from the following description that alternative embodiments of the structures and methods illustrated herein may be employed without departing from the principles of the invention described herein.

Some figures herein use like reference numerals to identify like elements. A letter after a reference numeral, such as "106A," indicates that the text refers specifically to the element having that particular reference numeral. A reference numeral in the text without a following letter, such as "106," refers to any or all of the elements in the figures bearing that reference numeral (e.g., "106" in the text would refer to reference numerals "106A" and/or "106B" in the figures).

DETAILED DESCRIPTION

FIG. 1 is a high-level block diagram of a system environment for a gateway system 130, in accordance with an embodiment. The system environment shown in FIG. 1 includes a client 110, a network 120, and a gateway system 130. For clarity, only one client 110 and one gateway system 130 are shown in FIG. 1. Alternate embodiments of the system environment can have any number of clients 110 and any number of gateway systems 130. Additionally, the relative configurations of the client 110 and the gateway system 130 may vary in different embodiments. The function performed by the various entities of FIG. 1 may also vary in different embodiments. As one example of an alternate embodiment, the client 110 and the gateway system 130 may be modules of the same machine.

The gateway system 130 coordinates the synchronization and display of data on clients 110. That is, the gateway system 130 acts as a backend to support information displayed to users at the client 110 which represents a frontend. The gateway system 130 stores and provides information about user interfaces for applications such as web applications. The web applications may, for example, be web applications for monitoring and interacting with local or remote industrial systems and processes.

User interfaces for the applications may be generated by a designer and may include views of components. A view container may be an aspect of a user interface that has properties to control the size of the graphical user interface display and that define how components can be added to a view. For example, a view of a user interface can be expressed by different container types all having similar properties for displaying components, where some of the types of views may include column, coordinate, tab, drawing, breakpoint, and flex. User interfaces may include graphical user interfaces that use one or more graphical elements for interfacing with one or more users. The gateway system 130 stores information about such interfaces for display at clients 110 and manages and routes underlying data that may cause changes to the display of the interface at a client 110. A component is a graphical element in a view and information about the component is stored in the gateway system 130 in the form of a component data model that includes component property values, i.e., named variables for storing values related to components. Some examples of components include user interaction components, such as sliders, buttons, text fields, and dropdown menus; this list is non-exhaustive. Examples of components may further include visual representations of machines or data related to industrial processes such as visual representations of pumps, gauges, dials, levers, motors, conveyor belts, tanks, ovens, graphs, and so forth.

The gateway system 130 acts as an intermediary between the actual industrial processes and information about such processes that is displayed at a client 110. In particular, the gateway system 130 makes it possible to establish uni-directional and bi-directional data bindings such that data coming from a data source, such as a data production system is reflected in information displayed at a client 110. If bi-directional, adjustments made to the industrial process through a component of a GUI at a client 110 also can make changes to the industrial process occurring at the data production system.

A data production system may be any system that acts as a data source for the gateway system 130. That is, a data production system provides data values to the gateway system 130. Examples of data production systems include open platform communications (OPC) servers, programmable logic controllers (PLCs), web servers supporting representational state transform application programming interfaces (RESTful APIs), databases, scripts, data transforms, or other systems that can provide data values or inputs. A data transform offers a chance to alter the value returned from a binding. For example, a property may be bound to an integer value and a transform used to map the integer value to a particular color. Thus a transform binding may be used as a way of splitting up complex expressions. In some embodiments, the gateway system 130 may act as a data production system when hosting user-defined data values (sometimes also referred to as "user defined tags"). For example, a designer may store a data value or information for generating a data value (e.g., a script) at the gateway system 130. A GUI displayed at a client 110 may incorporate information received from various combinations of different data production systems.

A user may view and interact with a GUI through a client 110. Clients 110 can be personal or mobile computing devices such as smartphones, tablets, or notebook computers, desktop computers, human machine interfaces (HMI), or other forms of computing devices. In some embodiments, the client 110 accesses GUIs provided by the gateway system 130 via a browser application running on the client 110 that accesses information on the gateway system 130 over the network 120. In some embodiments, the client 110 executes a client application that uses an application programming interface (API) to access GUIs provided by the gateway system 130 through the network 120.

As one example, a user may access a GUI for an industrial process by navigating to the GUI using a browser to interact with the gateway system 130. For example, a manager at an industrial bakery may want to know the temperature of a set of ovens in the bakery. The manager could access a GUI designed to display components representing the ovens and their current temperatures by navigating to the GUI, hosted by the gateway system 130, which is associated with oven temperatures via a browser on the client 110.

As an example, a PLC may be coupled to an oven for monitoring and control of oven parameters. PLC tag values generated by the PLC may be tuples of data values including a scalar value, a quality value, and a timestamp value. For example, a PLC may be coupled to an oven in an industrial bakery, and may be configured to monitor and control the oven's temperature and humidity. The PLC may provide data related to oven temperature and oven humidity to the gateway system 130 via a data production system. In one example the tuple of data values may include a scalar value for the temperature of the oven, a quality value of the scalar value retrieved from the PLC, and a timestamp value corresponding to the determined scalar value. Changes to the oven's temperature and humidity may be displayed via the GUI at clients 110. In some embodiments, the data production system can also receive data from the gateway system 130 and update associated systems and processes accordingly. For example, a manager at the industrial bakery may adjust target values for the temperature of an oven via components of the GUI at a client 110. The changed value related to oven temperature may be sent by the gateway system 130 to the data production system, which can adjust the actual temperature of the oven via the PLC.

Clients 110 can communicate with the gateway system 130 via the network 120, which may comprise any combination of local area and wide area networks employing wired or wireless communication links. In some embodiments, all or some of the communication on the network 120 may be encrypted.

Figure 2A:
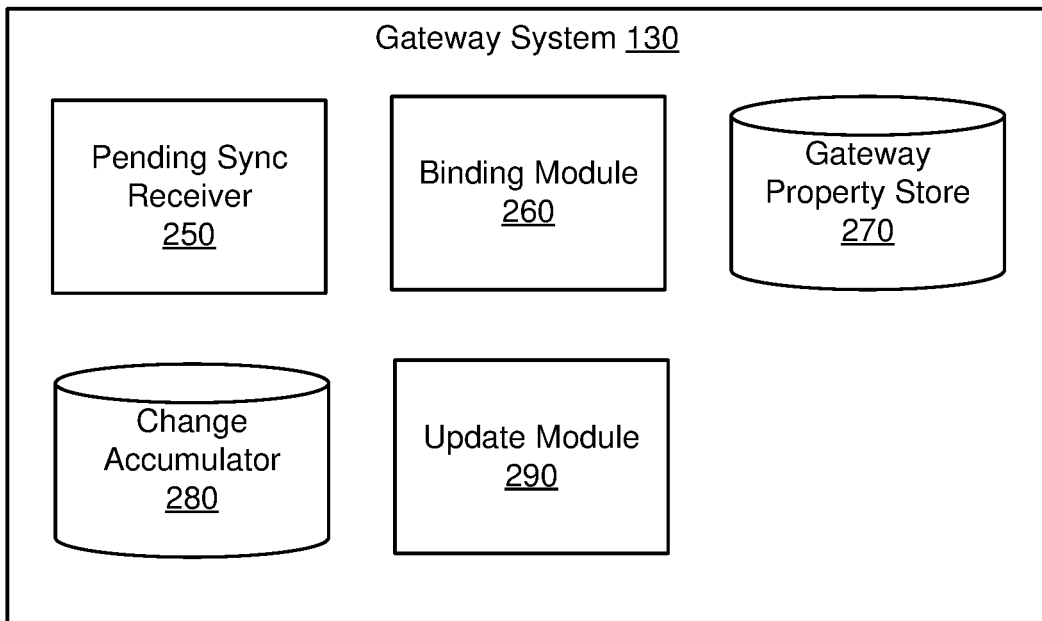
FIG. 2A is a high-level block diagram of a gateway system 130, in accordance with an embodiment.

FIG. 2A is a high-level block diagram of a gateway system 130, in accordance with an embodiment. In one embodiment, the gateway system 130 includes a pending sync receiver 250, a binding module 260, a gateway property store 270, a change accumulator 280, and an update module 290. In other embodiments, the gateway system 130 may include additional, fewer, and/or different modules from those listed herein. Conventional modules such as web servers, network interfaces, security functions, load balancers, management and network operations consoles, and failover servers are not shown so as to not obscure the details of the system architecture. Additionally, the gateway system 130 may include more, fewer, or different modules and data stores than those shown in FIG. 2A, and the functions can be distributed among the modules and data stores in a different manner than is shown in FIG. 2A.

The gateway property store 270 stores information about components (i.e., "component properties," or "property values") that can be included in a GUI. In particular, the gateway property store 270 stores property trees that define the properties of the components. The gateway property store 270 hosts the authoritative version of the various component property values and property tree configurations. A client 110 synchronizes its own data by updating its stored information to match the configuration and values provided by the gateway property store 270.

A property tree is a data structure comprising a collection of nodes, wherein each node defines some property related to the component (and thus a "property" is a named variable associated with a component). In one embodiment, each node includes a value, a quality, a timestamp value, and a configuration. The multiple values associated with a node are sometimes referred to in this document as a "data value," where a data value is understood to be a tuple of multiple values associated with a node. The quality component is an encoded value that describes the reliability or error state associated with the value. Various quality values may be assigned to various error states defined within the gateway system 130. For example, one quality value corresponds to values that are good, a few quality values correspond to a status of a data source (e.g., a PLC), and another few quality values correspond to statuses regarding execution of other operations while retrieving the values. The timestamp value records a time and date indicative of when the value was derived. The configuration of a node includes information about data bindings and script handlers that may be associated with the node. The value itself may be a number, a string, a null type, a Boolean, a dataset (i.e., a table-like structure of an ordered collection of rows and columns of information), an array forming an ordered sequence of other nodes in the property tree, or an unordered collection of other nodes.

By virtue of nodes whose values can be an array of other nodes or an unordered sequence of other nodes, a single node is able to encapsulate an arbitrarily structured, deeply nested collection of information, i.e., a tree data structure. These "property trees" are used to define the properties of the components in the GUI.

In one embodiment, the gateway property store 270 stores a component data model for each GUI component. A component data model comprises nodes that represent component properties structured into property trees, the structure of which trees is sometimes referred to herein as a "component hierarchy." Since component properties are represented by nodes in property trees, a component property may be associated with a data value or with a subtree of the component hierarchy comprising additional nodes. In one embodiment, each component property may additionally be assigned a name that identifies the component property.

Components are graphical elements that are placed and configured within a view of an application to be displayed in the GUI when the application is executed by a client 110. As a graphical element, each component has a shape that is defined by one or more features presented in the GUI. The features of components are graphical aspects of the components and are defined by component properties and data values (i.e., component property values) associated with each component property. For example, one feature of a component may be a shape, e.g., sliders, buttons, text fields, and dropdown menus. Some components may provide visual representations of machines in industrial processes such as visual representations of pumps, gauges, dials, levers, motors, conveyor belts, tanks, ovens, etc. For example, a component may be a visual representation of a temperature scale. In another example, the component may present a slider that is oriented horizontally. For example, a component representing an oven might be a visual representation of an oven and may have component properties such as label, location within the view, color, size, oven temperature, oven humidity, and so forth. In some embodiments, some component properties may store information that does not necessarily influence display of the component in the GUI, but may store additional information about the component or about a data source that may be associated with the component. For example, a designer may choose not to display oven humidity, even though humidity is a component property stored as a data value associated with the oven component.

Additionally, components may have one or more behavioral features. Behavioral features can accommodate various other operations by the gateway system. Examples of behavioral features include defining an input option (minimum or maximum on a numeric input field, type in a number, etc.), configuring accessibility permission to add alter or remove access to the functionality of the component, switching between whether or not a component is available for user interaction, detaching the way a component appears when disabled from what happens to the component data model, displaying part of a large data set and preloading other portions to enable scrolling without exhaustive loading of the entire data set (e.g., with a large array comprising 100,000 items that cannot be completely displayed by a component in a current configuration, preloading some of the items in the array for scrolling functionality), resizing one or more dimensions of a container layout, creating one or more windows, and repositioning windows.

Component properties may be categorized into general component properties, positional component properties, metadata component properties, and custom component properties. The general component properties may be similar to general view properties for the views which are general properties that are present when a component is initially placed into a view—in other words, general component properties are a standard set of component properties that accompany each initial placement of a component in a view of an application. The positional properties describe a relationship of the component to other items (e.g., components, containers, views, and/or pages). The positional component properties may further describe a display position of the component within a displayed view in the GUI. For example, the view may be 300 pixels by 300 pixels and the component may be 50 pixels by 50 pixels centered at the coordinate of [10 pixels, 100 pixels]. The metadata component properties provide additional information about a component. For example, a metadata component property may specify a name of the component, a component description, or a date or time stamp of component creation or last modification. The custom properties may be user-defined and can be specific to each component.

The pending sync receiver 250 receives sync messages from the client 110 that include pending sync objects. A pending sync object is a data object that includes information about component property values that have changed at the client 110 which stores its own copy of the component property trees and their associated values. The pending sync object is described in more detail in the description of FIG. 3A. The pending sync receiver 250 decodes the received messages and writes the values received via the pending sync objects to the gateway property store 270. In particular, the pending sync receiver 250 applies all changes that are included in the sync message from the client 110 to the corresponding property trees stored in the gateway property store 270. For example, values from the pending sync object may be written to the gateway property store 270 in the form of their corresponding value, quality, and timestamp tuples. The pending sync receiver 250 may also store a sync identification number received as a part of the pending sync object in the change accumulator 280.

The binding module 260 monitors and manages updates received from data bindings. A data binding is an association between one or more data values from a data source such as a data production system and one or more component properties (stored as information at nodes) in the gateway property store 270. A data binding may establish a relationship between a single component property and a single data value from a data production system, or a data binding may establish a relationship between a subtree of a component model and a subtree of a source data model (i.e., establishing a binding between multiple data values and multiple component properties at once) where a source data model comprises data values structured into a source hierarchy where a source hierarchy is a data structure, such as a tree structure. Source data may be received by the gateway system 130 from a data production system. As an example of a binding between a single component property and a single data value from a production system, a designer may specify a data binding between an oven component's component property for "color" and a data value representative of the actual oven temperature, and may configure the GUI such that the oven component's color will change from green to red when a data value received from the data production system indicates that the oven temperature is over 500 degrees Fahrenheit. As an example of binding a subtree of a component data model to a subtree of a source data model, a designer may specify a binding that associates a component data model that represents an oven to source data model that includes the data values associated with different features of the oven. That is, when any of the data values associated with the oven change (e.g., temperature, humidity, etc.) those data values with corresponding component properties in the bound oven component in the gateway property store 270 will update accordingly. Thus, component property information stored at the gateway property store 270 may be updated either by receiving information from a client 110 via the pending sync receiver 250 or by receiving updated information about a binding from a data source via the binding module 260.

The change accumulator 280 stores identification information associated with pending synchronization information. For example, the change accumulator 280 stores all modifications to all property trees, e.g., as stored in the gateway property store 270. Modifications to property trees stored in the gateway property store 270, such as by updates from the browser or updates via a binding, may trigger event notifications that are captured and logged in the change accumulator 280. The information stored in the change accumulator 280 may include an identification value that can indicate to a client 110 whether a pending sync received from the client 110 has been received and the changes are properly applied by the gateway system 130.

In one embodiment, the change accumulator 280 stores the modifications in a multi-tiered hash map. The first tier of the hash map includes a view instance identifier that uniquely identifies each view on a page of a GUI as displayed at a client 110. A second tier of the hash map is a component address, that is, a string path of component index arrays that uniquely identifies each component in a view of a GUI, and also provides a mechanism for efficiently finding the associated component in a view hierarchy (i.e., where the component information is stored in relation to other component information) by encoding an index position of each container on a path to the component. A third tier is a property path that uniquely identifies the modified property based on the location of the property in the property tree hierarchy.

The update module 290 manages updates to the change accumulator 280 and generates update messages for transmittal to a client 110. In some embodiments, the update module 290 detects changes in the gateway property store 220, or receives event notifications triggered by updates to values stored in the gateway property store 220. When an update occurs at the gateway property store 220, the update module 290 routes information about the update to the change accumulator 280. The update module 290 also generates update messages for the gateway system 130 to send to a client 110. An update message includes information about changes that have been saved in the change accumulator, e.g., since the last update message was sent. In one embodiment, the update module 290 includes only those component property values that have changed. The update module 290 sends an update message to a client 110 such that the client 110 can update its own property trees storing the component property values such that property trees stored in client property store 220 at the client 110 are synchronized with the property trees stored in the gateway property store 270 of the gateway system 130. More information about the update module 290 and update messages is included in the description of FIG. 3B.

Figure 2B:
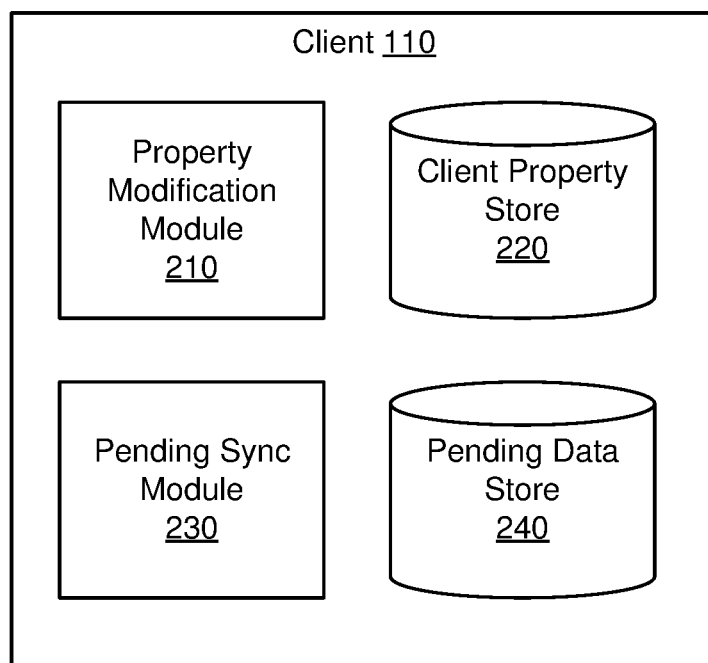
FIG. 2B is a high-level block diagram of a client 110, in accordance with an embodiment.

FIG. 2B is a high-level block diagram of a client 110, in accordance with an embodiment. The client 110 provides an application with a user interface to users. The application includes components that may allow a user to view or interact with property values of a system, such as an industrial system. In one embodiment, the client 110 includes a property modification module 210, a client property store 220, a pending sync module 230, and a pending data store 240. In other embodiments, the client 110 may include additional, fewer, and/or different modules from those listed herein. Conventional modules such as web servers, network interfaces, security functions, load balancers, management and network operations consoles, and failover servers are not shown so as to not obscure the details of the system architecture. Additionally, the client 110 may include more, fewer, or different modules and data stores than those shown in FIG. 2B, and the functions can be distributed among the modules and data stores in a different manner than is shown in FIG. 2B.

The property modification module 210 receives information about user interactions with UI components, e.g., changes to component property values based on user input. Accordingly, the property modification module 210 manages writing new values for component properties to the client property store 220. The property modification module 210 also receives update messages from the gateway system 130 that indicate changes have been made to property values and property tree configurations at the gateway property store 270. The property modification module decodes the update messages and writes the changes to the client property store 220.

The client property store 220 stores information related to components (i.e., "component properties," "property values") that are included in views of a GUI displayed by the client. In some embodiments, the client property store 220 acts as a local copy of the gateway property store 270 for the client 110. Like the gateway property store 270 of the gateway system 130, the client property store 220 stores property trees that define the properties of the components. However, the gateway property store 270 is the authoritative version of the component properties. When a property value changes or when a new component property is added at the client 110, the client property store 220 stores the value as a pending value. The pending value shadows the true value temporarily. Thus, in some embodiments, the client property store 220 temporarily stores both a pending value and a current value (e.g., a value for the component property that was most recently synchronized with the value for the component property as stored in the gateway property store 270). For example, if a user checks a checkbox component as displayed by the client 110, a new value indicating that the checkbox component is checked (e.g., checkbox_selected=true) is stored as a pending value. If a UI or other component accesses the checkbox selected value, the pending value will be returned until the pending value is cleared. This optimistic write strategy ensures that from the perspective of a user accessing the client 110, client-side changes seem to take effect immediately, even though the changes have not yet been synchronized with the gateway system 130. A pending value is cleared from the client property store 220 when an update message is received indicating the current value of the property has been received by the gateway system 130 and properly applied at the gateway property store 270. Upon receipt of such an update message, the current value of the component property is updated to match the updated value at the gateway system 130, and the pending value is removed so that a component accessing the value will access the updated current value rather than a pending value.

The pending sync module 230 manages updates to the pending data store 240 and generates pending sync objects for transmittal to the gateway system 130. In some embodiments, the pending sync module 230 detects changes in the client property store 220, or receives event notifications triggered by updates to values stored in the client property store 220. When an update occurs in the client property store 220, the pending sync module 230 routes information about the pending values to the pending data store 240. In one embodiment, when a property tree is written to, it fires an event that propagates up the property tree hierarchy storing the property values. The pending sync module 230 collects information about the UI view that holds the updated component value in a set of "dirty" views, i.e., views that have been modified and thus have one or more pending values. The pending sync module 230 also generates pending sync objects to send to the gateway system 130. In so doing, the pending sync module 230 may gather all the changes from the dirty views into a sync object and assigns the object an identifier, for example a number that increments by one each time a new sync ID is needed. A pending sync object may contain references to nodes within the gathered property trees that have pending values. The pending sync module 230 formats and encodes the pending sync object and sends one or more pending sync objects in a message to the gateway system 130, e.g., via a websocket connection. In one embodiment, the pending sync module 230 schedules transmission of pending sync objects to the gateway system and, in some cases, a new message with pending sync objects is not sent to the gateway system 130 until a previous pending sync object has been acknowledged as being applied by the gateway system 130.

The pending data store 240 stores information about pending component property values that are awaiting synchronization with the property values stored at the gateway system 130. In one embodiment, the pending data store 240 stores collected views and source components of a UI that include a pending value in their data hierarchy. The pending data store 240 may also store pending sync objects generated by the pending sync module 230. The pending sync module 230 may later access the information about the pending sync objects for identifying the locations of pending values within the client property store 220 to update and clear the pending values. In alternate embodiments, the pending sync module 230 may directly access the client property store 220 for information about pending values when generating pending sync objects or when updating the pending and current values based on update messages received from the gateway system 130.

Figure 3A:
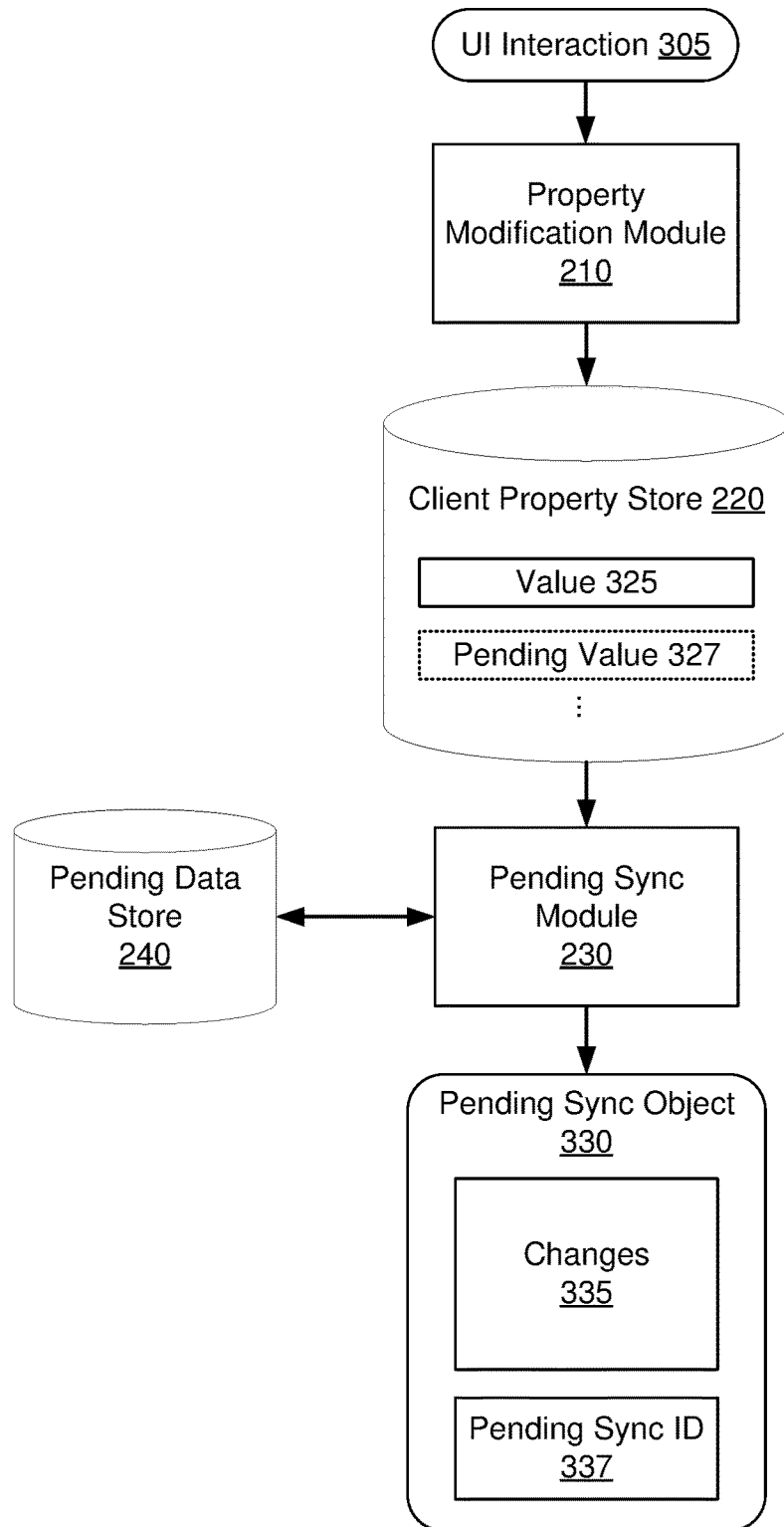
FIG. 3A is a data flow diagram illustrating a client phase of a synchronization cycle, in accordance with an embodiment.

FIG. 3A is a data flow diagram illustrating a client phase of a synchronization cycle, in accordance with an embodiment. In particular, FIG. 3A shows one example configuration by which a client 110 may generate a pending sync object 330 in response to a change to values (e.g., as generated by a UI interaction) stored at the client property store 220.

The client 110 receives a user interface interaction 305. For example, a user may check a checkbox on a view of a UI displayed by the client 110. The property modification module 210 updates the property values changed by the UI interaction 305 by writing the changes to the client property store 220. In particular, a pending value 327 is generated and stored in the client property store 220 along with a value 325. The value 325 represents a current component property value that has most recently been synchronized with the component property values at the gateway system 130. The pending value 327 shadows the value 325 and when the pending value 327 is present in the client property store 220, the client property store 220 will return the pending value 327 when the value of the component property is requested or accessed.

The pending sync module 230 responds to the addition of the pending value 327 to the client property store 220. The pending sync module stores information in the pending data store 240 about where the value 325 and related pending value 327 are stored within the client property store 220. For example, the pending data store 240 may include information about which views of a UI include components that access the value 325. If a synchronization is not already pending, the pending sync module 230 schedules a task for the near future (the exact timing may depend on the web browser implementation and user preference).

When the scheduled synchronization task occurs, the pending sync module 230 generates a pending sync object 330. A pending sync object 330 may include information about one or more changes 335 that have occurred at the client for synchronization with the gateway system 130. The changes may include information or metadata about pending values 327 in the client property store 220. The pending sync object 330 may include references to nodes within changed property trees that it describes. The pending sync module 230 also assigns the pending sync object 330 a pending sync identifier (ID) 337. In one embodiment, the pending sync ID is a number that increments by one each time a new sync ID is needed. The client 110 sends the pending sync object 330 to the gateway system 130 for synchronization. In one embodiment, the client 110 does not send another pending system object 330 until it receives confirmation from the gateway system 130 that the changes 335 in the previous pending sync object 330 have been applied at the gateway property store 270.

Figure 3B:
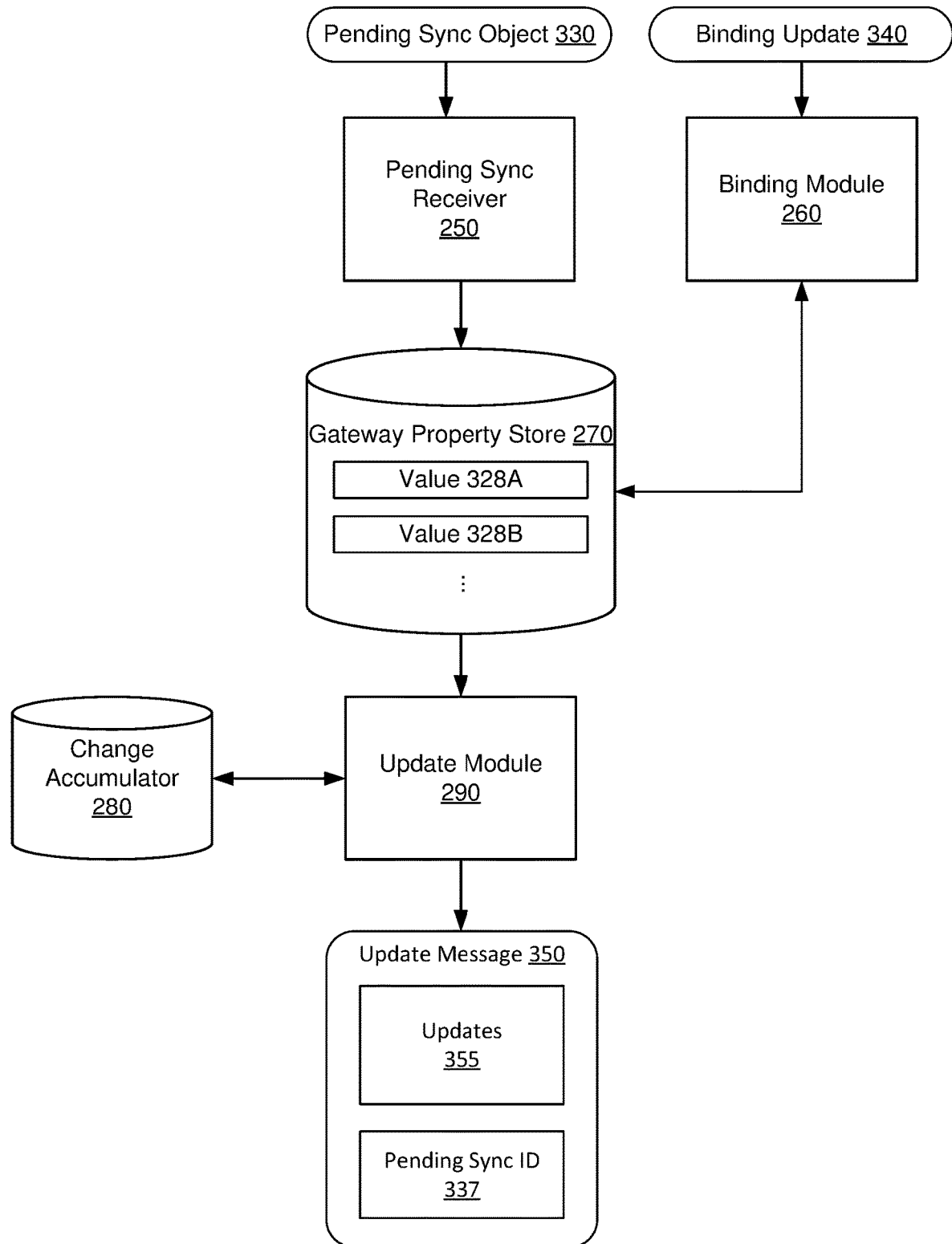
FIG. 3B is a data flow diagram illustrating a gateway system phase of a synchronization cycle, in accordance with an embodiment.

FIG. 3B is a data flow diagram illustrating a gateway system phase of a synchronization cycle, in accordance with an embodiment. In particular, FIG. 3B shows one example configuration by which a gateway system 130 may receive updates, modifications or, changes, or binding updates 340 to be applied to the gateway property store 270 and a method by which these values are sent to the client property store 220 of client 110 to synchronize component property values stored at the gateway property store 270 with pending values 327 stored in a client property store 220 of a client 110.

The gateway system 130 receives the pending sync object 330 from the client 110. In one embodiment, the pending sync object 330 is received at the pending sync receiver 250 which decodes the pending sync object 330 information and writes the information about changes 335 at the client (including pending component property values 327) to the gateway property store 270. In the example of FIG. 3B, the gateway property store 270 stores a plurality of component property values 328. For the sake of illustration, only two values 328A and 328B are depicted in the FIG. 3B. For each of the changes 335 included in the pending sync object 330, the pending sync receiver 250 identifies the corresponding value 328 stored in the gateway property store 270 and writes the pending value 327 indicated in the change 355 to the gateway property store 270 such that the value 328 stored at the gateway property store 270 is updated to match the pending value 327 that was changed at the client 110.

The update module 290 responds to updates to the gateway property store 270 by storing information about the updated values 328 in the change accumulator 280. In one embodiment, the information about the updated values 328 comprises the pending sync ID 337 that was included in the pending sync object 330 to identify the one or more changes 335.

The update module 290 generates an update message 350 to send to the client 110. The update message includes updates 355. In one embodiment, updates 355 include any changes to values 328 or other information (e.g., property tree configurations, etc.) at the gateway property store 270. In one embodiment, the information included in an update message 350 is based on the changes stored in the change accumulator 280, that is the changes to the gateway property store 270 that have occurred since the last time an update message 350 was sent. There are two timing parameters that control how frequently the update message 350 is sent to the client 110: (1) the debounce period and (2) the throttle period. The update message 350 will be sent no sooner than the debounce period after the change accumulator 280 receives a property change, and no sooner than the throttle time after the previous update message 350 was sent to the client 110. For example, the gateway system 130 may have a debounce timing parameter set at 10 ms and a throttle timing parameter set at 50 ms. These time periods are configurable by a user or administrator and can be used to tune the synchronization process to work well on different kinds of networks (e.g., ethernet, wifi, cellular, satellite, etc.).

Changes stored in the change accumulator 280 and, accordingly, included as updates 355 in the update message 350 are not limited to changes made based on the pending sync object 330. As shown in the example of FIG. 3B, values 328 may be updated at the gateway property store in other ways besides receiving changes from a client 110. The binding module 260 may receive binding updates 340 from a data production system or the like. The binding module 260 updates the corresponding value 328 at the gateway property store 270 accordingly. Thus, it is possible for the pending sync receiver 250 to update a value 328 based on changes received from the client in a pending sync object 330 and then for the binding module 260 to overwrite the same value 328 based on a received binding update 340. In one embodiment, the update message 350 includes the most recent change to a value, so that the client 110 can synchronize the values 325 stored at the client property store.

The update message 350 also includes a pending sync ID 337. The inclusion of a pending sync ID 337 in an update message 350 indicates that the gateway system 130 has received the pending sync object 330 associated with the pending sync ID and has updated the gateway property store 270 accordingly. In some cases, the update message 350 may include only changes from binding updates 340, and thus would include no pending sync ID 337. The gateway system 130 sends the update message 350 to the client 110.

Figure 3C:
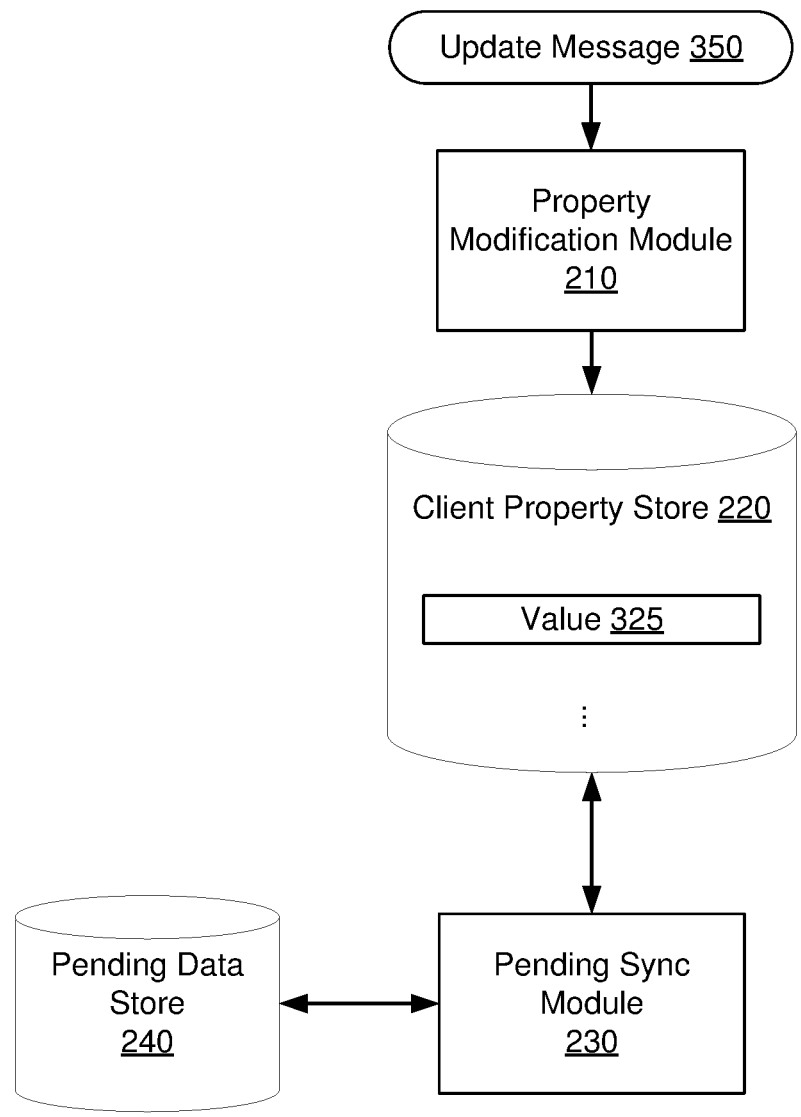
FIG. 3C is a data flow diagram illustrating another client phase of the synchronization cycle, in accordance with an embodiment.

FIG. 3C is a data flow diagram illustrating another client phase of the synchronization cycle, in accordance with an embodiment. The client 110 receives the update message 350. In one embodiment, the update message is received and decoded by the property modification module 210. When the property modification module 210 receives the update message 350, it decodes the message and updates the values 325 stored in the client property store 220 to match the values 328 at the gateway property store 270. In one embodiment, this update process takes advantage of path identifiers that were stored in the change accumulator 280 and included in the update message 350 (e.g., identifying view instance and component index path identifiers) to efficiently deliver the changes to the target property trees with algorithmic efficiency, since identification of views and components also includes information about where to find the views and components in the property tree hierarchy.

Once each property tree has been located in the client property store, the changes are applied to value 325 fields inside the nodes of the property trees. For example, in FIG. 3C the value 325 is updated to match the corresponding value 328 from the gateway property store 270.

If the update message 350 included a pending sync ID 337, the pending sync module 230 compares the pending sync ID 337 with the pending sync ID 337 stored in the pending data store 240. If the IDs match, then all of the changes that had been previously sent in the update message associated with the pending sync ID 337 have been properly applied to the property trees at the gateway property store 270 on the gateway system 130, and are thus synchronized. The pending sync module 230 can then remove the pending values 327 from the client property store (as shown in FIG. 3C compared with FIG. 3A). In one embodiment, the pending sync module 230 may also update the pending data store 240 to remove references to pending values 327 that have been synchronized.

Figure 4:
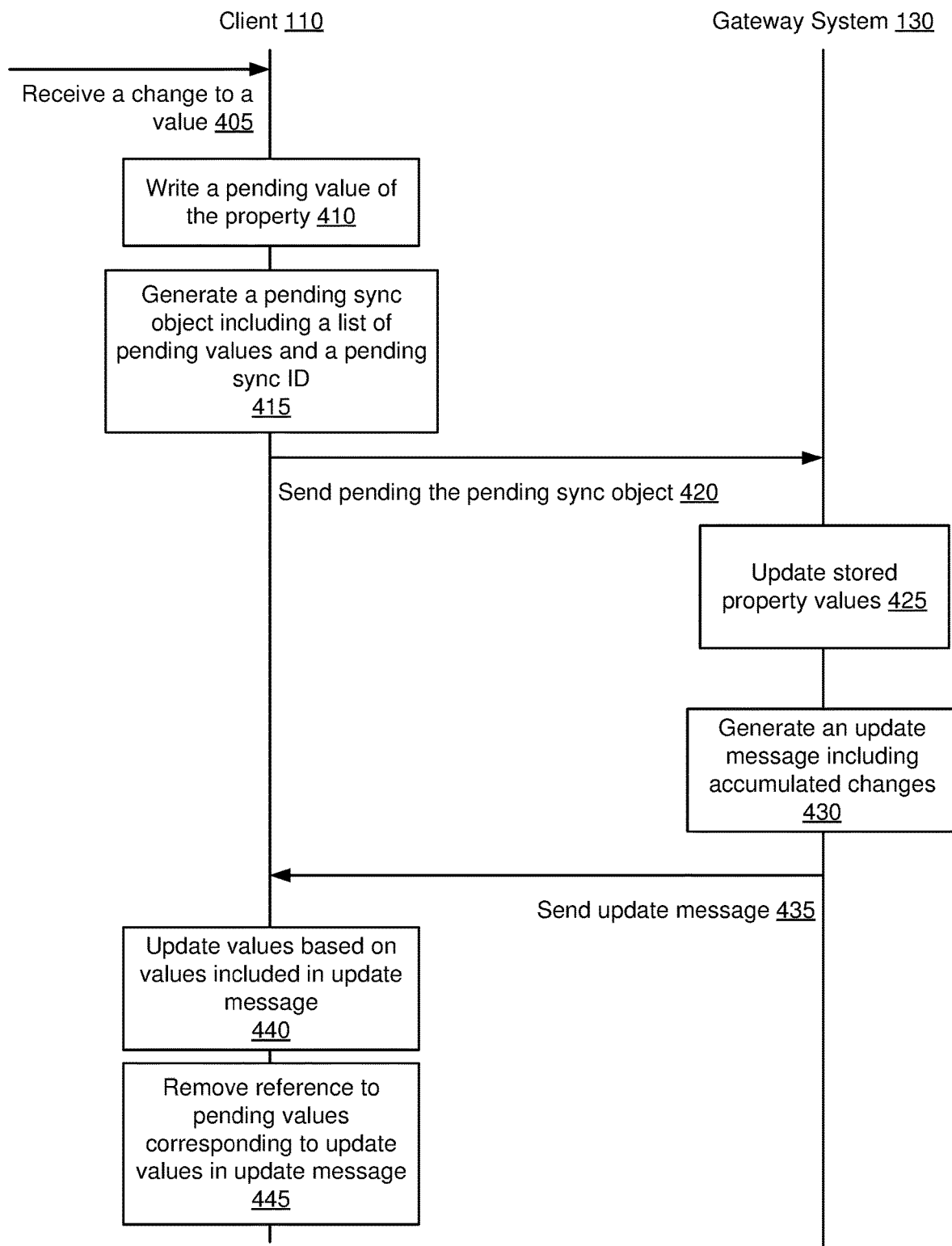
FIG. 4 is a sequence diagram illustrating the synchronization cycle, in accordance with an embodiment.

FIG. 4 is a sequence diagram illustrating the synchronization cycle, in accordance with an embodiment. The client 110 receives 405 a change to a component property value 325, for example, via a user interaction with a UI component. The client writes 410 a pending value 327 associated with the component property value 325. The client 110 generates 415 a pending sync object 330 including changes 335 such as a list of pending values 327 and a pending sync ID 337. The pending sync object 330 is sent 420 to the gateway system 130.

The gateway system 130 updates 425 the stored property values 328 based on the pending values 327 received in the pending sync object 330. The gateway system 130 generates 430 an update message including accumulated changes that have been applied to the gateway property store 270 and, if applicable, a pending sync ID 337. The gateway system sends 435 the update message to the client 110.

Upon receiving an update message 435 from the gateway system 130, the client updates 440 component property values 325 stored in the client property store 220. The client removes 445 references to pending values 327 if the pending sync ID 337 included in the update message 350 matches the pending sync ID associated with pending values 327.

Figure 5:
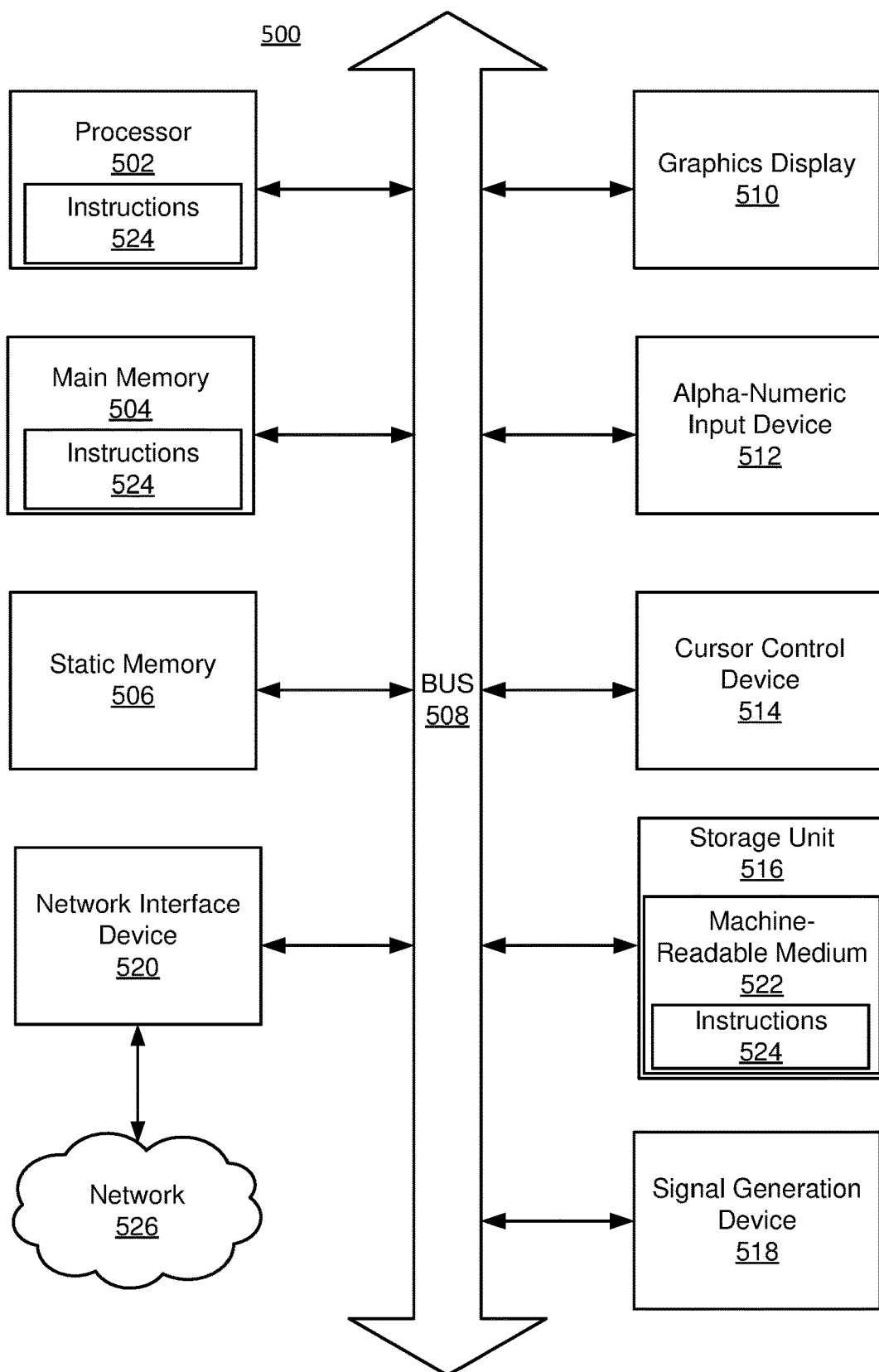
FIG. 5 s a block diagram illustrating components of an example machine able to read instructions from a machine-readable medium and execute them in one or more processors.

FIG. 5 is a block diagram illustrating components of an example machine able to read instructions from a machine-readable medium and execute them in one or more processors (or controllers). Specifically, FIG. 5 shows a diagrammatic representation of gateway system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 1202). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508. In some embodiments, the computer system 500 may include cell phone or smartphone hardware, such as a camera, motion sensor, accelerometer, scanner (or QR code reader), global positioning system (GPS) functionalities and geolocation abilities, near field communication, etc.

The storage unit 516 includes a machine-readable medium 522 on which is stored instructions 524 (e.g., software) embodying any one or more of the methodologies or functions described herein. For example, the instructions 524 may include instructions for implementing the functionalities of the pending sync receiver 250, the binding module 260 and/or the update module 290. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for synchronizing values stored at a client with values stored at a gateway system, the method comprising:
    receiving, from a user of the client, an updated value for a property of a component of an application running on the client, the property of the component having a client current value stored by the client;
    storing, by the client, the updated value as a pending value of the property such that when a value of the property of the component is subsequently requested from the client, the pending value will be accessed;
    after storing, at the client, the updated value as a pending value of the property and prior to receiving an update message from the gateway system indicating that a corresponding gateway current value stored by the gateway system has been updated, receiving, by the client, a request for a value of the property of the component;
    providing, in response to the received request, the pending value of the property;
    generating a pending synchronization object including a synchronization identifier and a set of pending values associated with a set of properties, the set of pending values including the pending value of the property;
    sending the pending synchronization object to the gateway system, the gateway system configured to update the corresponding gateway current value stored by the gateway based on the pending value of the property;
    receiving, at the client, the update message from the gateway system generated in response to the corresponding gateway current value being updated, the update message including the synchronization identifier indicative of the set of pending values that have been saved as updated values at the gateway system, wherein the set of pending values includes the corresponding gateway current value stored by the gateway;
    in response to the indication that the corresponding gateway current value stored by the gateway has been updated, overwriting the client current value of the property stored at the client with the pending value of the property; and
    removing the pending value from the client such that when the client subsequently receives a new request for the value of the property of the component, the updated client current value is accessed.

2. The computer-implemented method of claim 1, wherein receiving the updated value for the property of the component comprises receiving a change to a value for the property of the component made via a user interaction with a user interface.

3. The computer-implemented method of claim 1, wherein removing the pending value from the client comprises:
    matching the synchronization identifier received in the update message with the synchronization identifier that was included in the pending synchronization object;
    determining which of the set of pending values that were included in the pending synchronization object with the matching synchronization identifier were also contained in the update message; and
    removing the references to the pending property values associated with each of the determined pending values that were included in the update message such that the overwritten current property values are referenceable.

4. The computer-implemented method of claim 1, further comprising updating the components of a user interface based on the pending values of associated properties.

5. The computer-implemented method of claim 1, wherein the property is a named variable of a user interface component.

6. A computer system comprising:
    at least one processor for executing computer program instructions; and
    a non-transitory computer-readable storage medium comprising stored instructions executable by a processor that when executed cause the processor to:
        receive, from a user of the client, an updated value for a property of a component of an application running on the client, the property of the component having a client current value stored by the client;
        store, by the client, the updated value as a pending value of the property such that when a value of the property of the component is subsequently requested from the client, the pending value will be accessed;
        after storing, at the client, the updated value as a pending value of the property and prior to receiving an update message from the gateway system indicating that a corresponding gateway current value stored by the gateway system has been updated, receive, by the client, a request for a value of the property of the component;
        provide, in response to the received request, the pending value of the property;
        generate a pending synchronization object including a synchronization identifier and a set of pending values associated with a set of properties, the set of pending values including the pending value of the property;
        send the pending synchronization object to the gateway system, the gateway system configured to update the corresponding gateway current value stored by the gateway based on the pending value of the property;
        receive, at the client, the update message from the gateway system generated in response to the corresponding gateway current value being updated, the update message including the synchronization identifier indicative of the set of pending values that have been saved as updated values at the gateway system, wherein the set of pending values includes the corresponding gateway current value stored by the gateway;

in response to the indication that the corresponding gateway current value stored by the gateway has been updated, overwrite the client current value of the property stored at the client with the pending value of the property; and remove the pending value from the client such that when the client subsequently receives a new request for the value of the property of the component, the updated client current value is accessed.

7. The computer system of claim 6, wherein instructions that cause the processor to receive the updated value for the property of the component comprise instructions to receive a change to a value for the property of the component made via a user interaction with a user interface.

8. The computer system of claim 6, wherein instructions that cause the processor to remove the pending value from the client comprise instructions that cause the processor to:
match the synchronization identifier received in the update message with the synchronization identifier that was included in the pending synchronization object;
determine which of the set of pending values that were included in the pending synchronization object with the matching synchronization identifier were also contained in the update message; and
remove the references to the pending property values associated with each of the determined pending values that were included in the update message such that the overwritten current property values are referenceable.

9. The computer system of claim 6, further comprising instructions that cause the processor to update the components of a user interface based on the pending values of associated properties.

10. The computer system of claim 6, wherein the property is a named variable of a user interface component.

11. A non-transitory computer-readable storage medium comprising stored computer program instructions executable by at least one processor of a system, the instructions when executed causing the processor to:
receive, from a user of the client, an updated value for a property of a component of an application running on the client, the property of the component having a client current value stored by the client;
store, by the client, the updated value as a pending value of the property such that when a value of the property of the component is subsequently requested from the client, the pending value will be accessed;
after storing, at the client, the updated value as a pending value of the property and prior to receiving an update message from the gateway system indicating that a corresponding gateway current value stored by the gateway system has been updated, receive, by the client, a request for a value of the property of the component;
provide, in response to the received request, the pending value of the property;
generate a pending synchronization object including a synchronization identifier and a set of pending values associated with a set of properties, the set of pending values including the pending value of the property;
send the pending synchronization object to the gateway system, the gateway system configured to update the corresponding gateway current value stored by the gateway based on the pending value of the property;
receive, at the client, the update message from the gateway system generated in response to the corresponding gateway current value being updated, the update message including the synchronization identifier indicative of the set of pending values that have been saved as updated values at the gateway system, wherein the set of pending values includes the corresponding gateway current value stored by the gateway;
in response to the indication that the corresponding gateway current value stored by the gateway has been updated, overwrite the client current value of the property stored at the client with the pending value of the property; and
remove the pending value from the client such that when the client subsequently receives a new request for the value of the property of the component, the updated client current value is accessed.

12. The non-transitory computer-readable storage medium of claim 11, wherein instructions that cause the processor to receive the updated value for the property of the component comprise instructions to receive a change to a value for the property of the component made via a user interaction with a user interface.

13. The non-transitory computer-readable storage medium of claim 11, wherein instructions that cause the processor to remove the pending value from the client comprise instructions that cause the processor to:
match the synchronization identifier received in the update message with the synchronization identifier that was included in the pending synchronization object;
determine which of the set of pending values that were included in the pending synchronization object with the matching synchronization identifier were also contained in the update message; and
remove the references to the pending property values associated with each of the determined pending values that were included in the update message such that the overwritten current property values are referenceable.

14. The non-transitory computer-readable storage medium of claim 11, further comprising instructions that cause the processor to update the components of a user interface based on the pending values of associated properties.

* * * * *

UNITED STATES PATENT AND TRADEMARK OFFICE
CERTIFICATE OF CORRECTION

PATENT NO. : 11,055,070 B2
APPLICATION NO. : 17/087502
DATED : July 6, 2021
INVENTOR(S) : Gould et al.

Page 1 of 1

It is certified that error appears in the above-identified patent and that said Letters Patent is hereby corrected as shown below:

On the Title Page

Item (56), in Column 2, under "Other Publications", Line 3, delete "Miluntinovic2, (Fellow, IEEE). Nov. 2016" and insert -- Milutinovic2, (Fellow, IEEE), Nov. 8, 2016 --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*